US012776081B2

(12) United States Patent
Zhang et al.

(10) Patent No.: US 12,776,081 B2
(45) Date of Patent: Oct. 27, 2026

(54) EFFECT EDITION METHOD AND APPARATUS, ELECTRONIC DEVICE AND STORAGE MEDIUM

(71) Applicants: Lemon Inc., Grand Cayman (KY); Beijing Zitiao Network Technology Co., Ltd., Beijing (CN)

(72) Inventors: Runze Zhang, Los Angeles, CA (US); Jingbin Huang, Beijing (CN); Runjia Tian, Los Angeles, CA (US); Zhe Huang, Los Angeles, CA (US); Weifeng Huang, Beijing (CN)

(73) Assignees: Lemon Inc., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 169 days.

(21) Appl. No.: 18/734,782

(22) Filed: Jun. 5, 2024

(65) Prior Publication Data

US 2024/0412436 A1 Dec. 12, 2024

(30) Foreign Application Priority Data

Jun. 6, 2023 (CN) ......................... 202310667510.3

(51) Int. Cl.
*G06T 11/60* (2026.01)
*G06F 3/01* (2006.01)

(52) U.S. Cl.
CPC .............. *G06T 11/60* (2013.01); *G06F 3/017* (2013.01)

(58) Field of Classification Search
CPC ...... G06F 3/017; G06F 3/04845; G06T 11/60; G06T 11/40; H04N 21/47205; H04N 21/8146; H04N 21/816
See application file for complete search history.

(56) References Cited

U.S. PATENT DOCUMENTS

2021/0327111 A1* 10/2021 Vong ........................ G06T 11/60

OTHER PUBLICATIONS

Unity, "The Visual Effect Graph Window", Jul. 3, 2022, Wayback Machine, https://web.archive.org/web/20220703113838/https://docs.unity3d.com/Packages/com.unity.visualeffectgraph@7.1/manual/VisualEffectGraphWindow.html (Year: 2022).*

* cited by examiner

*Primary Examiner* — Kee M Tung
*Assistant Examiner* — Thang Gia Huynh
(74) *Attorney, Agent, or Firm* — BakerHostetler

(57) ABSTRACT

An effect edition method and apparatus, an electronic device and a storage medium are provided. The method includes: acquiring an effect action object to be added in response to an object addition trigger operation, and displaying an object subgraph corresponding to the effect action object in a visual edition region of an effect edition interface; displaying a logic subgraph corresponding to an effect action logic to be added in the visual edition region in response to a logic addition trigger operation for the effect action object, and establishing a connection relationship between the object subgraph and the logic subgraph to obtain an effect logic diagram corresponding to the effect action object; and displaying the effect action object with an effect outcome corresponding to the effect logic diagram in response to an effect display trigger operation.

20 Claims, 5 Drawing Sheets

EFFECT EDITION METHOD AND APPARATUS, ELECTRONIC DEVICE AND STORAGE MEDIUM

CROSS-REFERENCE TO RELATED APPLICATION

The present application claims the priority of Chinese patent application No. 202310667510.3 filed on Jun. 6, 2023, and the entire content disclosed by the Chinese patent application is incorporated herein by reference as part of the present application.

TECHNICAL FIELD

Embodiments of the present disclosure relate to a field of human-computer interaction technology, and more particularly, to an effect edition method and apparatus, an electronic device and a storage medium.

BACKGROUND

In image processing or video fabrication scenarios, application of effect is highly favored by users. After effect edition is completed, the edited effect may be used for processing an image or a video, to obtain an image or a video having an effect outcome.

SUMMARY

At least one embodiment of the present disclosure provides an effect edition method, which comprises: acquiring an effect action object to be added in response to an object addition trigger operation, and displaying an object subgraph corresponding to the effect action object in a visual edition region of an effect edition interface; displaying a logic subgraph corresponding to an effect action logic to be added in the visual edition region in response to a logic addition trigger operation for the effect action object, and establishing a connection relationship between the object subgraph and the logic subgraph to obtain an effect logic diagram corresponding to the effect action object; and displaying the effect action object with an effect outcome corresponding to the effect logic diagram in response to an effect display trigger operation.

At least one embodiment of the present disclosure further provides an effect edition apparatus, which comprises: an effect action object adding module, configured to acquire an effect action object to be added in response to an object addition trigger operation, and display an object subgraph corresponding to the effect action object in a visual edition region of an effect edition interface; an effect action logic adding module, configured to display a logic subgraph corresponding to the effect action logic to be added in the visual edition region in response to a logic addition trigger operation for the effect action object, and establish a connection relationship between the object subgraph and the logic subgraph to obtain an effect logic diagram corresponding to the effect action object; and an effect outcome display module, configured to display the effect action object with an effect outcome corresponding to the effect logic diagram in response to an effect display trigger operation.

At least one embodiment of the present disclosure further provides an electronic device, which comprises: one or more processors; a storage apparatus, configured to store one or more programs; the one or more programs, when executed by the one or more processors, cause the one or more processors to implement the effect edition method provided by any embodiment of the present disclosure.

At least one embodiment of the present disclosure further provides a storage medium, which comprises computer executable instructions; the computer executable instructions, when executed by a computer processor, are configured to execute the effect edition method provided by any embodiment of the present disclosure.

BRIEF DESCRIPTION OF DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

DETAILED DESCRIPTION

Figure 1:
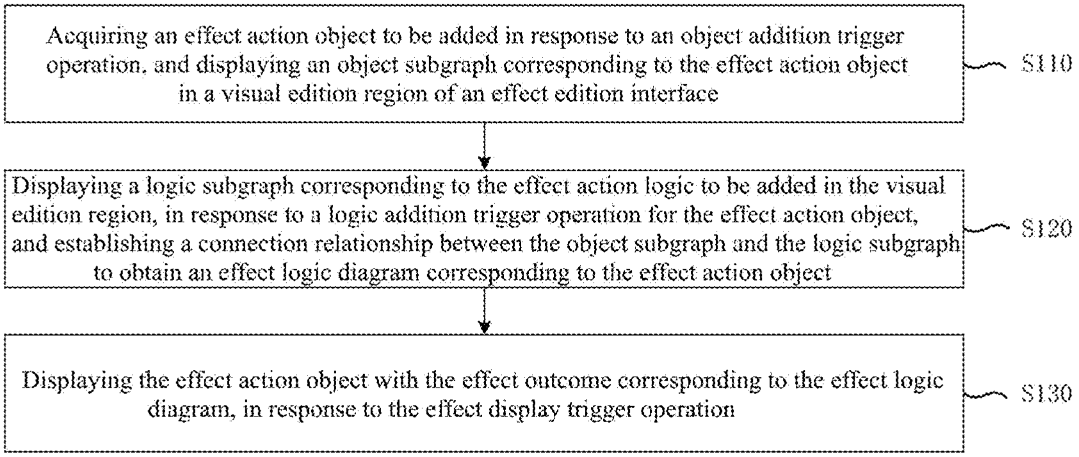
FIG. 1 is a schematic flow chart of an effect edition method provided by an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

Names of messages or information interacted between a plurality of apparatuses according to the implementations of the present disclosure are only used for illustrative purposes, and are not used to limit the scope of these messages or information.

It may be understood that before using the technical solutions disclosed in the respective embodiments of the present disclosure, a user should be informed of type, usage scope, usage scenarios, etc. of personal information involved in the present disclosure and authorization from the user should be acquired according to relevant laws and regulations in an appropriate manner.

For example, in response to receiving an active request of a user, a prompt message is sent to the user to clearly remind the user that the operation to be executed as requested by the user will require acquiring and using personal information of the user. Thus, according to the prompt information, the user may autonomously choose whether to provide personal information to software or hardware such as an electronic device, an application, a server, or a storage medium that executes the operation of the technical solution of the present disclosure.

As an optional but non-restrictive implementation, in response to receiving an active request of a user, a prompt message may be sent to the user through a pop-up window, where a prompt message may be presented in text. In addition, the pop-up window may also carry a selection control for the user to choose whether to "agree" or "disagree" to provide personal information to an electronic device.

It may be understood that the above-described processes of informing and acquiring user authorization are only illustrative and do not constitute a limitation on the implementation of the present disclosure; other modes that meet relevant laws and regulations may also be applied to the implementation of the present disclosure.

It may be understood that the data involved in the technical solution (including but not limited to the data per se, acquisition or use of data) should comply with requirements of corresponding laws, regulations and relevant stipulations.

In the related technologies, during effect edition, a developer usually edits an effect outcome that may be implemented by an effect prop through code writing, and the effect outcome corresponding to the effect can only be displayed after the code is written. Such effect edition method requires a high level of professionalism from a user. For a user without programming experience, it takes a long time to learn before the user may understand the effect edition process, which has certain professional limitations and is laborious, affecting effect edition experience of the user.

Before introducing the technical solution, application scenarios will be exemplarily illustrated firstly. The technical solution may be applied to any scenario of effect edition; exemplarily, during effect edition, an effect action object and an effect action logic may be firstly determined, and further, based on the effect action logic, an effect outcome of the effect action object in an image may be determined; in the existing effect edition mode, a user may configure a set of effect action logics of a "effect triggering mode", a "effect action object response", and a "effect action mode" usually through some option settings;

the user have no perception of the effect edition process and cannot customize any edit item in the effect action logic, resulting in monotonous effect outcomes of the effect action object, which has certain limitations. At this time, based on the technical solution of the embodiments of the present disclosure, the user may acquire an effect action object based on an object addition trigger operation, and have an object subgraph of the effect action object displayed based on a visual edition region; further, an effect action logic corresponding to the effect action object may be determined according to a logic addition trigger operation input by the user, and a logic subgraph corresponding to the effect action logic is displayed; the logic subgraph is connected with the object subgraph to obtain an effect logic diagram; further, an effect outcome is determined based on the effect logic diagram, and the effect action object is displayed based on the determined effect outcome, so as to implement a visual edition process of the effect outcome of the effect action object. This may be implemented through simple interactive operations and is more widely applicable, which improves effect edition experience.

FIG. 1 is a schematic flow chart of an effect edition method provided by an embodiment of the present disclosure; the embodiment of the present disclosure is applicable to a situation of determining an effect outcome of the effect action object, based on the effect action object and the effect action logic. The method may be executed by an effect edition apparatus; the apparatus may be implemented in a form of software and/or hardware, and optionally, may be implemented through an electronic device; and the electronic device may be a mobile terminal, a PC terminal, or a server, etc.

As shown in FIG. 1, the method according to the embodiment may specifically include:

S110: acquiring an effect action object to be added in response to an object addition trigger operation, and displaying an object subgraph corresponding to the effect action object in a visual edition region of an effect edition interface.

It should be noted that the apparatus that executes the effect edition method provided by the embodiment of the present disclosure may be integrated into application software that supports an effect action object edition function, and the software may be installed in an electronic device; optionally, the electronic device may be a mobile terminal or a PC terminal, etc. The application software may be a type of software that edits the effect action object. The specific application software will not be repeated here, as long as the effect action object may be edited. The application software may also be a specially developed application integrated into software for editing the effect action object, or integrated into corresponding pages, so that a user may edit the effect action object through an integrated page on the PC terminal.

In this embodiment, the object addition trigger operation may include an object exhibition trigger operation and an object selection trigger operation. In practical applications, a variety of effect action objects may be pre-developed, and an object identifier corresponding to each type of effect action object may be determined; each object identifier may be associated with the corresponding effect action object, and meanwhile, the object identifier may be stored in a material library of the application software as a candidate object identifier, so that when an object exhibition trigger operation for the effect action object is detected, a plurality of candidate object identifiers pre-stored may be exhibited based on a display interface, and the user may select from the plurality of candidate object identifiers through a trigger operation; and when an object selection trigger operation for any candidate object identifier is detected, an effect action object corresponding to the candidate object identifier may be acquired, and the acquired effect action object may be taken as an effect action object to be added.

Optionally, the object exhibition trigger operation may be a click operation for a pre-developed object exhibition control, for example, the click operation may be a single-click operation or a multi-click operation (e.g., a double-click operation); or, the object exhibition trigger operation may also be receiving an instruction or a code used for exhibiting a candidate object identifier, and exhibiting the plurality of candidate object identifiers pre-stored in response to receiving the instruction or the code.

Optionally, the object selection trigger operation may be a click operation for the candidate object identifier, for example, the click operation may be a single-click operation or a multi-click operation (e.g., a double-click operation); or, for convenience of user operation, the object selection trigger operation may be also be: when detecting that a pause duration of the user on the candidate object identifier based on an input device or a touch point reaches a preset duration, taking the operation as an object selection trigger operation for the candidate object identifier; acquiring the effect action object corresponding to the candidate object identifier selected in response to the operation; and taking the acquired effect action object as the effect action object to be added.

In this embodiment, the effect action object may be an effect prop added to an image or a video to make the image or the video present an effect display effect. The effect action object may also be a portion of image region in an image to be processed. The effect edition interface may be an interface for editing the effect action object. The effect edition interface may at least include an effect action object display region and a visual edition region, etc. For example, the effect action object display region may be used for displaying the object identifier of the effect action object to be added, or, may be used for displaying the object identifier of the added effect action object in the effect processed image; and the visual edition region may be used for editing an effect outcome to be exhibited by the effect action object, and to visualize the edition process.

In this embodiment, the object subgraph may be an interactive entry for the user to edit the effect action object. A key parameter corresponding to the effect action object may be displayed in the object subgraph, and the key parameter may include a configurable parameter and/or a non-configurable parameter.

In practical applications, when an object addition trigger operation is detected, the effect action object to be added may be acquired in response to the trigger operation, the object identifier corresponding to the effect action object to be added is displayed in the effect action object display region of the effect edition interface; and meanwhile, the object subgraph corresponding to the effect action object to be added is determined, and the object subgraph is displayed in the visual edition region of the effect edition interface.

It should be noted that in order to display the effect outcome of the effect action object more clearly, an image display region may also be pre-developed in the effect edition interface; the image display region may be used for displaying the image to be processed or the effect processed image. For example, the image to be processed may be an image having not been added with an effect action object; the effect processed image may be an image having been added with an effect action object. In practical applications, while displaying the object subgraph of the effect action object to be added in the visual edition region, the effect action object to be added may also be added to the image to be processed, to obtain the effect processed image.

In practical applications, when the added effect processed image is displayed in the image display region of the effect edition interface, the object addition trigger operation further includes another implementation: displaying the effect processed image based on the image display region of the effect edition interface, and displaying an object identifier of an effect action object having been added in the effect processed image based on the effect action object display region of the effect edition interface; displaying the object identifier of the selected effect action object in a differential manner in the effect action object display region, in response to the object selection trigger operation for the effect action object having been added in the effect processed image; and displaying the object subgraph corresponding to the selected effect action object in the visual edition region of the effect edition interface, in response to a subgraph display operation for the object identifier displayed in a differential manner. For example, the subgraph display operation may be any operation for the object identifier; and optionally, may be a drag operation for the object identifier, etc.

Figure 2:
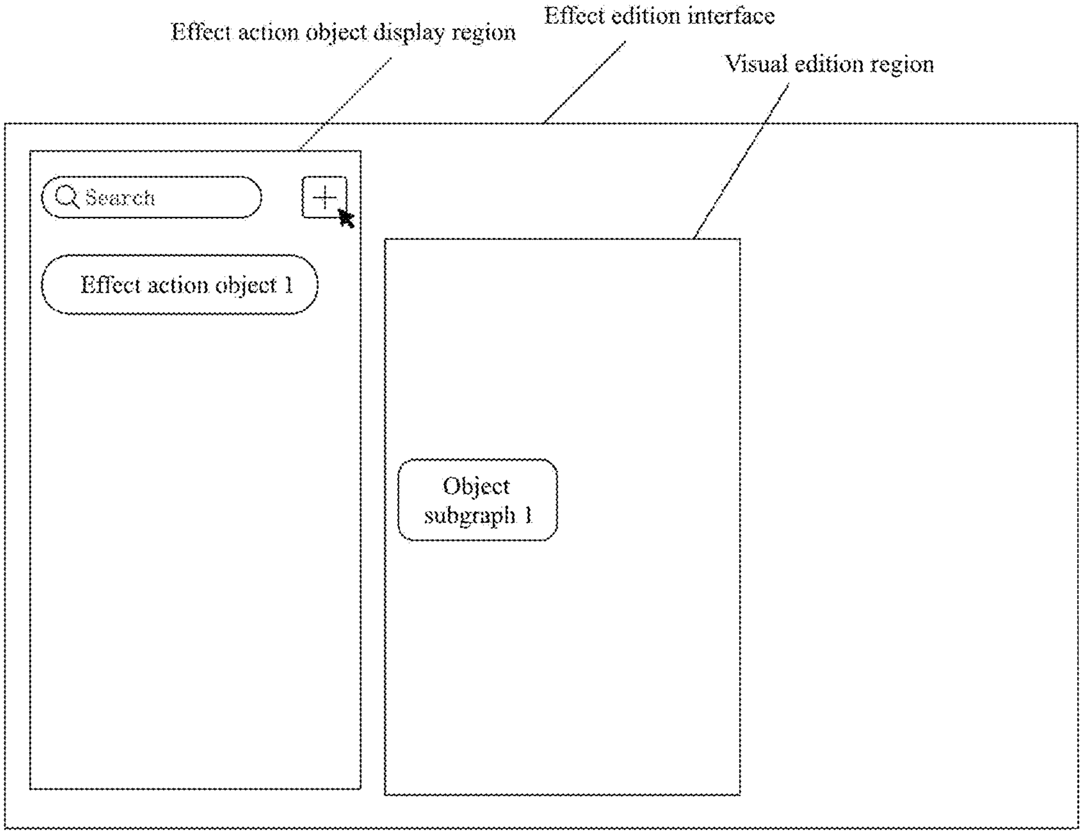
FIG. 2 is a schematic diagram of an effect edition interface provided by an embodiment of the present disclosure.

Exemplarily, as shown in FIG. 2, which is a schematic diagram of the effect edition interface; and the effect edition interface may include an effect action object display region, a visual edition region, an image display region, and an effect action logic display region. For example, the effect action object display region may include an object addition trigger control "+". When a mouse cursor (an arrow in the diagram) enters a trigger operation for the control "+", a plurality of candidate effect action objects may be exhibited; when a trigger operation for any candidate effect action object is detected, the candidate effect action object may be taken as the effect action object to be added; an object identifier of the effect action object may be displayed in the effect action object display region; meanwhile, the object subgraph corresponding to the effect action object may be displayed in the visual edition region, for example, the effect action object to be added may be effect action object 1; the object identifier 1 may be displayed in the effect action object display region; and object subgraph I may be displayed in the visual edition region.

Optionally, before the displaying an object subgraph corresponding to the effect action object in a visual edition region of an effect edition interface, the method further includes: displaying the visual edition region in the effect edition interface in response to a region display trigger operation. Exemplarily, the region display trigger operation may be a trigger operation used for opening the effect edition interface, or a trigger operation acting on a preset control used for displaying the visual edition region, etc.

S120: displaying a logic subgraph corresponding to the effect action logic to be added in the visual edition region, in response to a logic addition trigger operation for the effect action object, and establishing a connection relationship between the object subgraph and the logic subgraph to obtain an effect logic diagram corresponding to the effect action object.

In this embodiment, after determining the effect action object to be added, action logic edition may be performed on the effect action object, to determine an effect display effect of the effect action object in the image.

In this embodiment, the logic addition trigger operation for the effect action object may include a variety of implementations; and the variety of implementations may be respectively illustrated below.

One implementation may be as follows: when an effect edition tool to which the effect edition interface is subordinate to only includes one type of effect action logic, the logic addition trigger operation for the effect action object may be a trigger operation for a pre-developed logic addition control; when the trigger operation is detected, the effect action logic included in the effect edition tool may be determined as the effect action logic to be added in response to the trigger operation, and the logic subgraph corresponding to the effect action logic to be added is determined and displayed in the visual edition region.

Another implementation may be as follows: when an effect edition tool to which the effect edition interface is subordinate to includes a variety of effect action logics, and each effect action logic is associated with an object type of the effect action object, then the logic addition trigger operation for the effect action object may include a logic display trigger operation and a logic selection trigger operation. In practical applications, after determining the effect action object to be added, when the logical display trigger operation for the effect action object is detected, the object type of the effect action object to be added may be determined; the effect action logic corresponding to the object type may be fetched from the pre-stored effect action logics according to the object type, and the fetched effect action logic is displayed in a corresponding region of the effect edition interface; further, the user may select from the effect action logics displayed on the effect edition interface through the trigger operation; when a logic selection trigger operation by the user for any effect action logic is detected, the selected effect action logic may be determined as an effect action logic to be added; and a logic subgraph corresponding to the effect action logic to be added is displayed in the visual edition region of the effect edition interface.

In this embodiment, the effect action logic may be understood as a way the effect action object acts on the image and/or a way the effect action object carries out effect exhibition in the image. The logic subgraph may be understood as an interactive entry for the user to edit the effect action logic. The logic subgraph may include one or more logic nodes. For example, the logic node may be understood as an interactive entry for the user to edit the corresponding effect action logic; a key parameter corresponding to the logic node may be displayed in the logic node; the key parameter may include a configurable parameter or a non-configurable parameter. It should be noted that in a case of including one logic node in the logic subgraph, the logic node is just the logic subgraph.

It should be noted that the logic node may also include at least one level of node subgraph, that is, the logic node may also include one level of node subgraph or a plurality of levels of node subgraph; and each level of node subgraph may include a plurality of child nodes. A first-level node subgraph corresponding to the logic subgraph is a node subgraph corresponding to the logic node in the logic subgraph. A second-level or a next-level node subgraph may be understood as a node subgraph including a child node belonging to a previous-level node subgraph. The node subgraph may be understood as an interactive entry for the user to edit at least one subordinate action logic of the effect action logic. The child node may be understood as an interactive entry for the user to edit the corresponding subordinate action logic of the effect action logic. A key parameter corresponding to the child node may be displayed in the child node; and the key parameter may include a configurable parameter or a non-configurable parameter.

For example, the logic subgraph may include logic node 1; logic node 1 may include a first-level node subgraph; the first-level node subgraph may include child node 11, child node 12, and child node 13. Further, the logic node may also include a second-level node subgraph associated with the first-level node subgraph, for example, which may be a node subgraph corresponding to child node 11 in the second-level node subgraph, and may specifically include child node 111, child node 112, and child node 113. Further, the logic node may also include a third-level node subgraph associated with the second-level node subgraph, etc.

In practical applications, when a logic addition trigger operation for the effect action object is detected, the effect action logic to be added corresponding to the effect action object is determined in response to the trigger operation, and the logic subgraph corresponding to the effect action logic is determined, so as to display the determined logic subgraph in the visual edition region, and connect the object subgraph and logic subgraph displayed in the visual edition region according to the logical relationship between the effect action object and the effect action logic, to obtain the effect logic diagram corresponding to the effect action object. For example, the effect logic diagram may be a logical topology diagram that characterizes the effect outcome edition process of the effect action object. The effect logic diagram may include a plurality of subgraphs and lines used for connecting any two subgraphs.

It should be noted that the number of effect action logics to be added may be one or a plural; when the number of effect action logics to be added is one, the corresponding logic subgraph of the effect action logic may be displayed in the visual edition region, a connection relationship between the object subgraph and the logic subgraph may be established to obtain the effect logic diagram, and the effect logic diagram may include two subgraphs and a connection line between the two subgraphs; when the number of effect action logics to be added is a plural, logic subgraphs corresponding to these effect action logic may be respectively displayed in the visual edition region, thereafter, for each effect action logic, an object subgraph and a logic subgraph may be connected according to the logical relationship between the effect action object and the effect action logic, to establish a connection relationship between the object subgraph and each logic subgraph, and further an effect logic diagram may be obtained, for example, the effect logic diagram may include the object subgraph and a plurality of logic subgraphs corresponding to the object subgraph, as well as a connection line between the object subgraph and each logic subgraph.

S130: displaying the effect action object with the effect outcome corresponding to the effect logic diagram, in response to the effect display trigger operation.

In this embodiment, an effect display control may be pre-developed in the effect edition interface, or a program code for implementing an effect display trigger operation may be pre-written, so that after obtaining the effect logic diagram corresponding to the effect action object, when a trigger operation for the effect display control is detected, or when the program code for implementing the effect display trigger operation is received, it may be determined that the effect display trigger operation is detected, and then the effect logic diagram is processed in response to the trigger operation, so that the effect action object may be displayed with the effect outcome corresponding to the effect logic diagram.

In practical applications, in order to visually display the effect outcome corresponding to the effect logic diagram, after obtaining the effect logic diagram corresponding to the effect action object, the effect logic diagram may be processed to convert the effect logic diagram into a script file including the effect action logic code. Further, the script file may be executed to obtain the effect outcome corresponding to the effect logic diagram, so that the effect action object may be displayed with the effect outcome.

Optionally, the displaying the effect action object with the effect outcome corresponding to the effect logic diagram, includes: generating an effect execution script corresponding to the effect action object based on the effect logic diagram; executing the effect execution script to obtain the effect outcome; and displaying the effect action object with the effect outcome.

In this embodiment, the effect execution script may also be understood as a script obtained by performing script conversion on the effect logic diagram. The effect execution script may be a computer executable file that writes the effect action logic code according to a certain format. The effect outcome may be a corresponding display effect when controlling effect display of the effect action object to be added based on the effect action logic to be added.

In specific implementation, when an effect display trigger operation is detected, a script converting method for converting the effect logic diagram into a script may be fetched in response to the trigger operation; further, the effect logic diagram may be converted into an effect execution script; and the obtained effect execution script may be executed to obtain the effect outcome, so that the effect action object may be displayed with the obtained effect outcome. Advantages of such setting lie in that: effect edition is more beginner-friendly, and the steps of effect edition operations are simplified, which improves efficiency of effect edition, and enhances user experience of using the effect edition tool.

The technical solution of the embodiment of the present disclosure involves: acquiring the effect action object to be added in response to the object addition trigger operation, and displaying the object subgraph corresponding to the effect action object in the visual edition region of the effect edition interface, which may accurately capture editing intention the user for the effect action object; displaying the object subgraph of the effect action object, and adding the visual edition region in the effect edition interface to visualize the effect edition process; further, displaying the logic subgraph corresponding to the effect action logic to be added in the visual edition region, in response to the logic addition trigger operation for the effect action object, and establishing the connection relationship between the object subgraph and the logic subgraph to obtain an effect logic diagram corresponding to the effect action object, which enhances correlation between the effect action object and the effect action logic; obtaining the effect logic diagram based on subgraph connection, which simplifies the effect edition operation process; and finally, displaying the effect action object with the effect outcome corresponding to the effect logic diagram in response to the effect display trigger operation, thereby solving the technical problem in the related technologies that effect edition is time-consuming and laborious due to excessively high professional requirements, and implementing visual presentation of the edition process of the effect outcome of the effect action object, which may be implemented through simple interactive operations, with wider applicability and improved effect edition experience.

Figure 3:
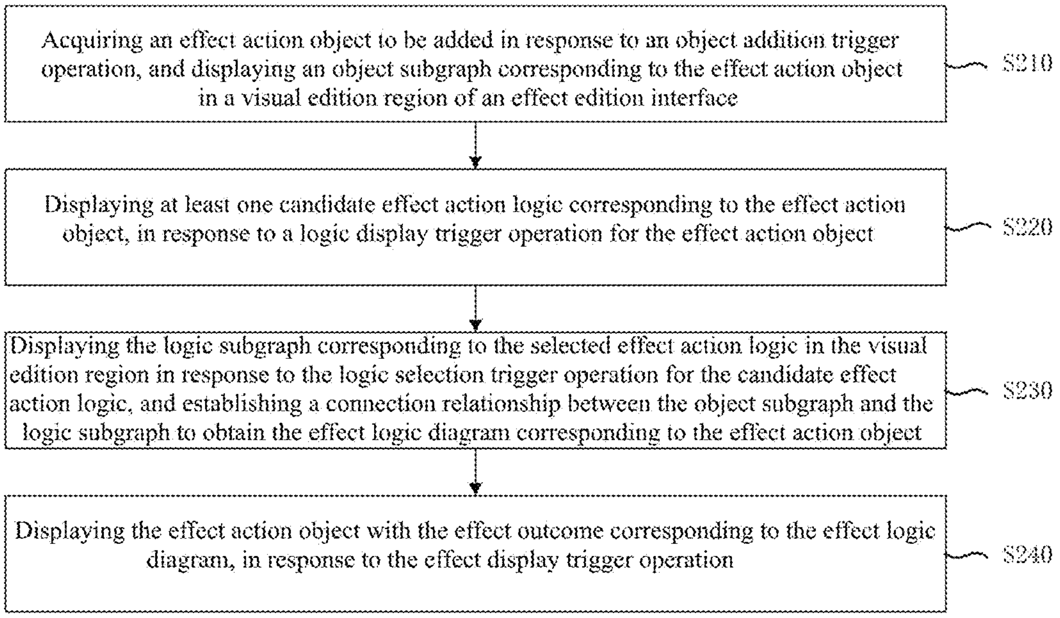
FIG. 3 is a schematic flow chart of an effect edition method provided by an embodiment of the present disclosure.

FIG. 3 is a schematic flow chart of an effect edition method provided by an embodiment of the present disclosure. On the basis of the above-described embodiment, in the technical solution of this embodiment, a candidate effect action logic corresponding to an effect action object may be displayed in response to a logic display trigger operation for the effect action object; further, an effect action logic to be added is determined in response to a logic selection trigger operation for the candidate effect action logic, so that a logic subgraph corresponding to the effect action logic to be added may be displayed in a visual edition region. Illustration of this embodiment may be referred to for a specific implementation. For example, technical features the same as or similar to the foregoing embodiments will not be repeated here.

As shown in FIG. 3, the method according to this embodiment may specifically include:

S210: acquiring an effect action object to be added in response to an object addition trigger operation, and displaying an object subgraph corresponding to the effect action object in a visual edition region of an effect edition interface.

S220: displaying at least one candidate effect action logic corresponding to the effect action object, in response to a logic display trigger operation for the effect action object.

In this embodiment, a logic display control may be preset in the effect edition interface, so that when a trigger operation by the user for the control is detected, it may be determined that the logic display trigger operation is detected; and further at least one candidate effect action logic corresponding to the effect action object may be displayed in response to the trigger operation. Optionally, the logic display control may be set in any position in the effect edition interface, or may also be set in a menu list corresponding to the effect action object to be added. In practical applications, when the logic display control is a control set in any position in the effect edition interface, the user may directly input a trigger operation for the control; and when a trigger operation for the control is detected, at least one candidate effect action logic corresponding to the effect action object may be displayed any region of the effect edition interface in response to the trigger operation; when the logic display control is a control set in the menu list corresponding to the effect action object to be added, then after acquiring the effect action object to be added, an object identifier corresponding to the effect action object is displayed in an effect action object display region of the effect edition interface, thereafter, the menu list corresponding to the effect object is exhibited in response to a selection trigger operation for the displayed object identifier, for example, the menu list may include at least one executable operation or configurable parameter corresponding to the effect action object; and further, at least one candidate effect action logic corresponding to the effect action object may be displayed in the effect edition interface, in response to a trigger operation for the logic display control.

In this embodiment, the candidate effect action logic may be a pre-stored effect action logic matched with the effect action object to be added. In the related technologies, one or more effect action logics are usually pre-developed, and none effect action logic is associated with the effect action object; that is to say, the candidate effect action logic (i.e., one or more pre-developed effect action logics) displayed in response to the logic display trigger operation is always the same, whichever effect action object among the preset effect action objects the effect action object to be added may be, which may lead to low adaptability between the effect action logic and the effect action object, and affect the effect outcome. Based on the technical solution provided by the embodiment of the present disclosure, after pre-determining the plurality of effect action objects, the plurality of effect action objects may be classified based on preset classification criteria; further, an effect action logic corresponding to each type of effect action object may be preset, and the effect action logic may be associated with the type of the effect action object, so that after determining the effect action object to be added, at least one candidate effect action logic corresponding to the effect action object may be determined and displayed based on the type of the effect action object, which may improve adaptability between the effect action object and the effect action logic, improve the effect display effect, enhance the effect display effect, and improve effect edition experience of the user. Optionally, the preset classification criteria may include classification based on effect action position, classification based on action subject of effect action object in image, or classification based on effect display depth.

In practical applications, in a case where the effect action object to be added is acquired, when a logic display trigger operation for the effect action object is detected, the type corresponding to the effect action object may be determined; further, based on the type corresponding to the determined effect action object, at least one candidate effect action logic corresponding to the effect action object may be acquired from the pre-configured effect action logics and displayed.

Optionally, the displaying at least one candidate effect action logic corresponding to the effect action object, includes: determining at least one candidate effect action logic corresponding to the effect action object, based on the object type corresponding to the effect action object, and displaying the candidate effect action logic.

In this embodiment, the object type may be understood as a type determined after the effect action objects are classified based on the preset classification criteria. Optionally, the object type may include a type determined based on effect action subject, a type determined based on effect action position, and a type determined based on effect display depth, etc. In practical applications, when the object type is determined based on effect action subject, the object type may include sticker class, makeup class, filter class, deformation class, and stylization class, etc.; when the object type is determined based on effect action position, the object type may include facial class, limb and torso class, background class, and foreground class, etc.; when the object type is determined based on effect display depth, the object type may include foreground class, subject class, background class, etc.

In practical applications, a plurality of effect action objects may be predetermined and these effect action objects are classified according to object types corresponding thereto; further, based on type attributes of the object types, an effect action logic corresponding to each object type of effect action object may be developed, the effect action logic may be associated with the object type; and the developed effect action logic may be stored in a database of the application software.

In a specific implementation, in a case where the effect action object to be added is acquired, when the logic display trigger operation for the effect action object is detected, the object type corresponding to the effect action object may be determined firstly; further, according to the determined object type, the effect action logics corresponding to the object type may be fetched from the pre-stored effect action logics, the fetched effect action logics is taken as the candidate effect action logics corresponding to the effect action object, and these candidate effect action logics are displayed in the effect edition interface. Advantages of such setting lie in that: correlation between the effect action object and the effect action logic is enhanced, which further improves the effect display effect of the effect action object and enhances effect edition experience of the user.

S230: displaying the logic subgraph corresponding to the selected effect action logic in the visual edition region in response to the logic selection trigger operation for the candidate effect action logic, and establishing a connection relationship between the object subgraph and the logic subgraph to obtain the effect logic diagram corresponding to the effect action object.

In this embodiment, the candidate effect action logic may be preset to a selectable state; further, when any displayed candidate effect action logic is in a selected state, the effect action logic may be taken as the selected effect action logic, and the logic subgraph corresponding to the selected effect action logic may be displayed in the visual edition region.

In practical applications, the logic selection trigger operation for the candidate effect action logic may be any operation acting on the candidate effect action logic, for example, a click operation for the candidate effect action logic. For example, the click operation may be a single-click operation or a multi-click operation (e.g., a double-click operation, etc.). For convenience of user operation, the logic selection trigger operation for the candidate effect action logic may also be: when detecting that a pause duration of the user on the candidate object identifier based on an input device or a touch point reaches a preset duration, taking the candidate effect action logic as the selected effect action logic; further, determining the logic subgraph corresponding to the selected effect action logic, displaying the determined logic subgraph in the visual edition region of the effect edition interface; and connecting the object subgraph and the logic subgraph displayed in the visual edition region to establish a connection relationship between the object subgraph and the logic subgraph, so as to obtain the effect logic diagram corresponding to the effect action object.

Figure 4:
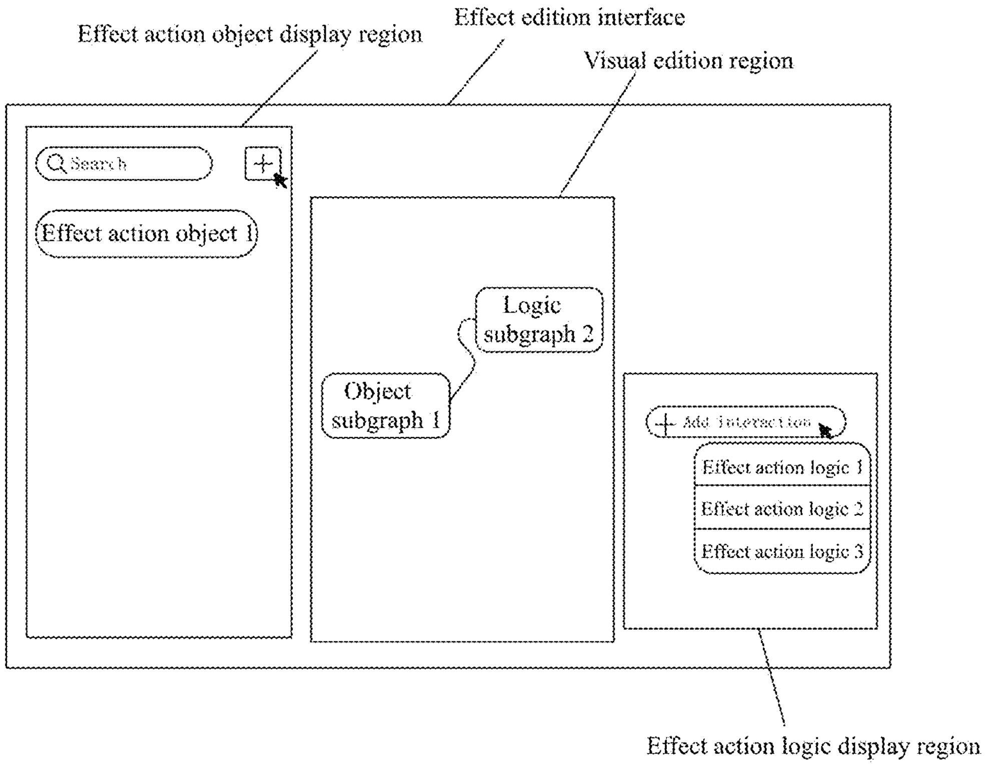
FIG. 4 is a schematic diagram of an effect edition interface provided by an embodiment of the present disclosure.

Exemplarily, as shown in FIG. 4, which is a schematic diagram of the effect edition interface; and the effect edition interface may further include an effect action logic display region. For example, the effect action logic display region may include a logic display trigger control "+Add interaction"; when a mouse cursor (an arrow in the diagram) enters a trigger operation on the control "+Add interaction", a plurality of candidate effect action logics corresponding to effect action object 1 may be exhibited, which may include effect action logic 1, effect action logic 2, and effect action logic 3; when a trigger operation for any candidate effect action logic is detected, the candidate effect action logic may be taken as the effect action logic to be added, and the logic subgraph corresponding to the effect action logic may be displayed in the visual edition region; for example, the effect action logic to be added may be effect action logic 2; logic subgraph 1 may be displayed in the visual edition region; and further, a connection relationship between object subgraph 1 and logic subgraph 2 may be established, to obtain the effect logic diagram corresponding to effect action object 1.

S240: displaying the effect action object with the effect outcome corresponding to the effect logic diagram, in response to the effect display trigger operation.

The technical solution of the embodiment of the present disclosure involves: acquiring the effect action object to be added in response to the object addition trigger operation, and displaying the object subgraph corresponding to the effect action object in the visual edition region of the effect edition interface; further, displaying at least one candidate effect action logic corresponding to the effect action object, in response to the logic display trigger operation for the effect action object; thereafter, displaying the logic subgraph corresponding to the selected effect action logic in the visual edition region in response to the logic selection trigger operation for the candidate effect action logic, and establishing the connection relationship between the object subgraph and the logic subgraph to obtain the effect logic diagram corresponding to the effect action object; and finally, displaying the effect action object with the effect outcome corresponding to the effect logic diagram, in response to the effect display trigger operation, which achieves the effect of improving adaptability between the effect action object and the effect action logic, improves the effect display effect, meanwhile, meets the user's personalized edition needs for effect outcomes, and enhances use experience of the effect edition tool for the user.

Figure 5:
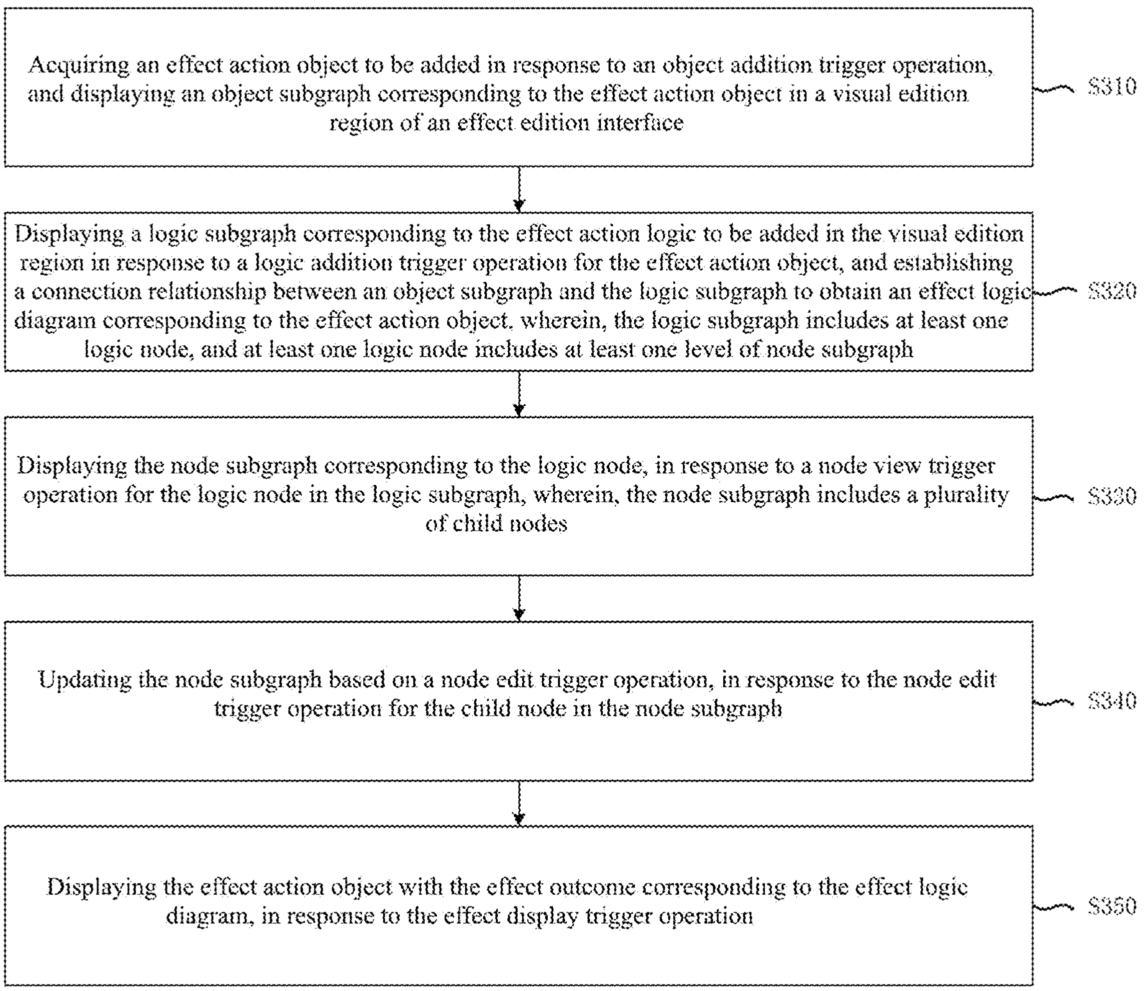
FIG. 5 is a schematic flow chart of an effect edition method provided by an embodiment of the present disclosure.

FIG. 5 is a schematic flow chart of an effect edition method provided by an embodiment of the present disclosure. On the basis of the above-described embodiment, in the technical solution of this embodiment, after a logic subgraph corresponding to an effect action logic is displayed in a visual edition region, when a node view trigger operation for a logic node included in the logic subgraph is detected, a node subgraph corresponding to the logic node is displayed; further, when a node edition trigger operation for a child node included in the node subgraph is detected, the node subgraph is updated. Illustration of this embodiment may be referred to for a specific implementation. For example, technical features the same as or similar to the foregoing embodiments will not be repeated here.

As shown in FIG. 5, the method according to this embodiment may specifically include:

- S310: acquiring an effect action object to be added in response to an object addition trigger operation, and displaying an object subgraph corresponding to the effect action object in a visual edition region of an effect edition interface.
- S320: displaying a logic subgraph corresponding to the effect action logic to be added in the visual edition region in response to a logic addition trigger operation for the effect action object, and establishing a connection relationship between an object subgraph and the logic subgraph to obtain an effect logic diagram corresponding to the effect action object, for example, the logic subgraph includes at least one logic node, and at least one logic node includes at least one level of node subgraph.

Figure 6:
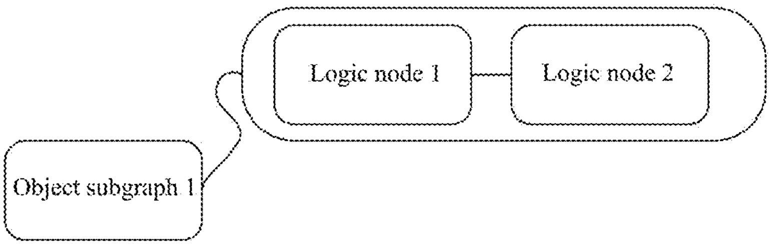
FIG. 6 is a schematic diagram of a logic subgraph including a plurality of logic nodes provided by an embodiment of the present disclosure.

In this embodiment, the logic node included in the logic subgraph is associated with the action logic included in the effect action logic to be added, that is to say, the number of action logics included in the effect action logic to be added is matched with the number of logic nodes included in the logic subgraph. It should be noted that when a logic subgraph includes one logic node, a subgraph corresponding to the logic node may be taken as the logic subgraph and displayed in the visual edition region; when the logic subgraph includes a plurality of logic nodes, subgraphs corresponding to the plurality of logic nodes may be taken as the logic subgraphs and displayed in the visual edition region. For example, as shown in FIG. 6, the logic subgraph may include logic node 1 and logic node 2.

In this embodiment, for each logic node, the logic node may include at least one level of node subgraphs, that is, include one or more levels of node subgraph. It should be noted that when a logic node includes one level of node subgraph, it may indicate that there is only one level of node subgraph subordinate to the logic node. For example, when a logic node is a first-level node, then a node subgraph included in the logic node is a second-level node subgraph, and the second level is a subordinate level of the first level; when a logic node includes a plurality of levels of node subgraph, it may be indicate that there are a plurality of levels of node subgraphs subordinate to the logic node; for example, when the logic node is a first-level node, node subgraphs included in the logic node may be a second-level node subgraph, a third-level node subgraph, and a fourth-level node subgraph, etc., and the second level is a subordinate level of the first level, the third level is a subordinate level of the second level, and the fourth level is a subordinate level of the third level.

S330: displaying the node subgraph corresponding to the logic node, in response to a node view trigger operation for the logic node in the logic subgraph, for example, the node subgraph includes a plurality of child nodes.

In this embodiment, the logic subgraph may include at least one logic node; each logic node may include at least one node subgraph; the logic node in the logic subgraph may be preset to a triggerable state for viewing, so that the user may view a node subgraph included in any logic node in the exhibited logic subgraph, and thus, the user may clearly and intuitively understand the number of levels of node subgraph included in each logic node and each level of node subgraph.

In this embodiment, the node view trigger operation for the logic node in the logic subgraph may be any trigger operation acting on the logic node, for example, a click operation for the logic node. For example, the click operation may be a single-click operation or a multi-click operation (e.g., a double-click operation, etc.). For convenience of user operation, the node view trigger operation for the logic node may also be: when detecting that a pause duration of the user on the logic node in the logic subgraph based on an input device or a touch point reaches a preset duration, taking the logic node as a selected logic node; and further, displaying the node subgraph of the selected logic node in the visual edition region.

In practical applications, when the logic subgraph corresponding to the effect action logic to be added is displayed in the visual edition region, the displayed logic subgraph may include at least one logic node; at least one logic node is displayed in the visual edition region; the user may input a node view trigger operation for any displayed logic node through an input device or a touch point; when a node view trigger operation for any logic node is detected, the logic node corresponding to the node view trigger operation is taken as the logic node to be viewed, and the node subgraph corresponding to the logic node to be viewed is displayed in the visual edition region in response to the node view trigger operation.

It should be noted that when the logic node corresponding to the node view trigger operation only includes one level of node subgraph, after displaying the node subgraph corresponding to the logic node in the visual edition region, the node view trigger operation cannot be input again for a child node included in the displayed node subgraph, in other words, the child node included in the displayed node subgraph does not include a next level of node subgraph; when the logic node corresponding to the node view trigger operation includes a plurality of levels of node subgraph, after displaying the node subgraph corresponding to the logic node in the visual edition region, the node view trigger operation may also be input again for a child node included in the displayed node subgraph, the node subgraph corresponding to the child node is displayed in response to the node trigger operation, and thereafter, the node view trigger operation may continue to be input for a child node included in the displayed node subgraph, to display the node subgraph corresponding to the child node, until the child node included in the displayed node subgraph is in a non-triggerable state, which may indicate that the child node included in the displayed node subgraph does not include a next level of node subgraph.

S340: updating the node subgraph based on a node edition trigger operation, in response to the node edition trigger operation for the child node in the node subgraph.

In this embodiment, when the node subgraph corresponding to the logic node is displayed in the visual edition region, the user may also edit the displayed node subgraph through an input device (e.g., a mouse or a keyboard) or a touch point, so as to achieve an effect of custom edition of the logic subgraph by the user.

In this embodiment, the node edition trigger operation may be understood as an interactive operation of editing the child node in the displayed node subgraph. The node edition trigger operation includes at least one of a node addition trigger operation, a node modification trigger operation, and a node deletion trigger operation. For example, the node addition trigger operation may be understood as a trigger operation of adding a child node in the node subgraph. The node modification trigger operation may be understood as a trigger operation of modifying a selected child node. It should be noted that the node modification trigger operation may be modifying the child node in the displayed node subgraph; or may also be modifying the node subgraph corresponding to the child node when the child node includes at least one level of node subgraph, specifically, displaying the node subgraph corresponding to the child node in response to the node view trigger operation for the child node in the node subgraph; and further, updating the node subgraph corresponding to the child node based on the node modification trigger operation in response to the node modification trigger operation for the node subgraph corresponding to the child node. The node deletion trigger operation may be understood as a trigger operation of deleting a child node included in the node subgraph.

In practical applications, when the node subgraph corresponding to the logic node is displayed in the visual edition region, the displayed node subgraph may include a plurality of child nodes; the user may input a node edition trigger operation to the displayed child node through an input device or a touch point based on effect edition needs; when a node edition trigger operation for a child node in the node subgraph is detected, the child node corresponding to the node edition trigger operation may be taken as the child node to be edited, and the node subgraph to which the child node to be edited is subordinate to may be updated based on the detected node edition trigger operation, in response to the detected node edition trigger operation.

In a specific implementation, when a node addition trigger operation for a child node in the node subgraph is received, at least one child node in the node subgraph is added in response to the node addition trigger operation; when a node modification trigger operation for a child node in the node subgraph is received, the child node is taken as the child node to be edited, and the child node to be edited is modified, in response to the node modification trigger operation; when a modification confirmation operation for the child node to be edited is received, the child node to be edited may be updated, and the node subgraph to which the child node is subordinate may be updated; when a node deletion trigger operation for a child node in the node subgraph is received, the child node corresponding to the node deletion trigger operation is deleted, to update the node subgraph based on the node deletion trigger operation in response to the node deletion trigger operation.

It should be noted that the node edition trigger operation may be input for a child node in any level of node subgraph displayed in the visual edition region; in other words, a child node in any level of node subgraph displayed in the visual edition region may be edited; and further, the subordinate node subgraph may be updated based on the node edition trigger operation.

S350: displaying the effect action object with the effect outcome corresponding to the effect logic diagram, in response to the effect display trigger operation.

The technical solution of the embodiment of the present disclosure involves: acquiring the effect action object to be added in response to the object addition trigger operation, and displaying the object subgraph corresponding to the effect action object in the visual edition region of the effect edition interface; further, displaying the logic subgraph corresponding to the effect action logic to be added in the visual edition region in response to the logic addition trigger operation for the effect action object, and establishing the connection relationship between the object subgraph and the logic subgraph to obtain the effect logic diagram corresponding to the effect action object, for example, the logic subgraph includes at least one logic node, and at least one logic node includes at least one level of node subgraph; thereafter, displaying the node subgraph corresponding to the logic node, in response to the node view trigger operation for the logic node in the logic subgraph, for example, the node subgraph includes a plurality of child nodes; updating the node subgraph based on the node edition trigger operation, in response to the node edition trigger operation for the child node in the node subgraph; and finally, displaying the effect action object with the effect outcome corresponding to the effect logic diagram, in response to the effect display trigger operation, which achieves the effect of viewing and custom edition of the logic node in the logic subgraph, meets the user's need for custom edition of the effect action logic, and improves diversity of effect outcomes corresponding to the effect logic diagram.

Figure 7:
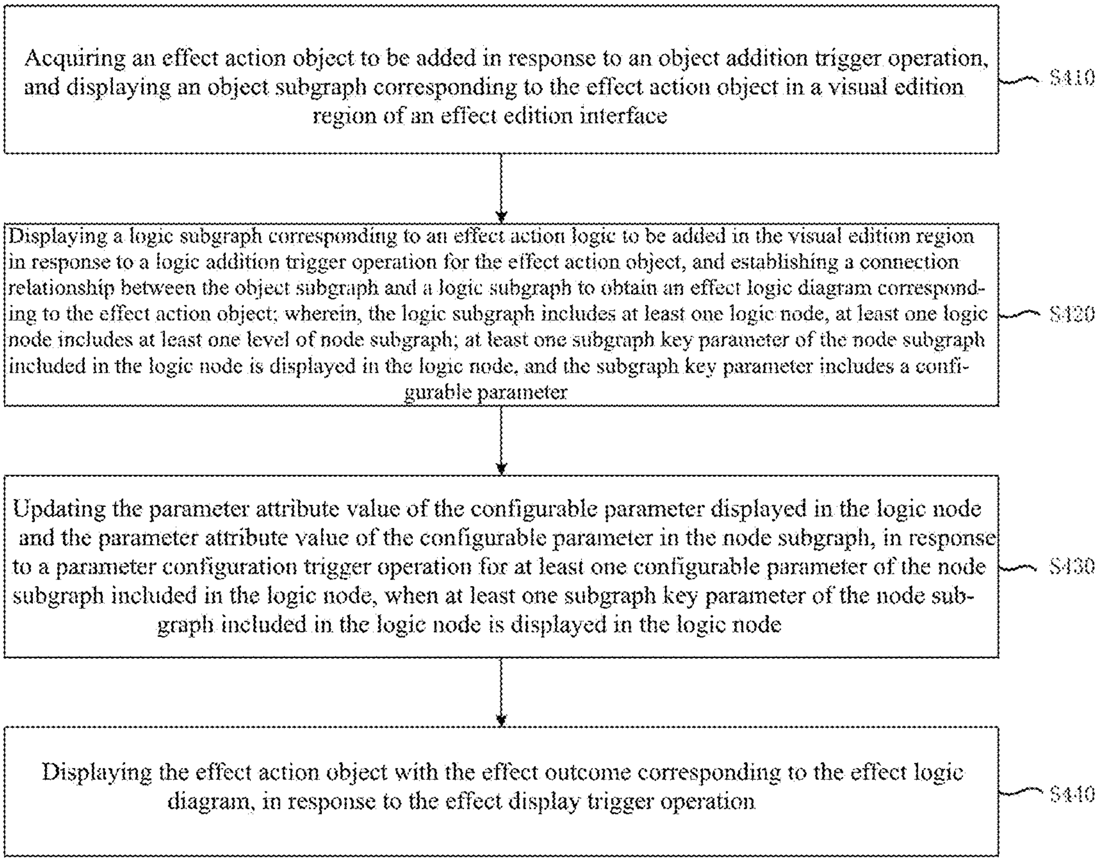
FIG. 7 is a schematic flow chart of an effect edition method provided by an embodiment of the present disclosure.

FIG. 7 is a schematic flow chart of an effect edition method provided by an embodiment of the present disclosure. On the basis of the above-described embodiment, in the technical solution of this embodiment, after displaying a logic subgraph in a visual edition region, a logic node in the logic subgraph displays a subgraph key parameter of a node subgraph included in the logic node; further, a configurable parameters in the subgraph key parameter displayed in the logic node may be configured to update a parameter attribute value of the logic node and a parameter attribute value of the node subgraph, so as to update the logic subgraph to generate an effect logic diagram based on the logic subgraph and the object subgraph updated. Illustration of this embodiment may be referred to for a specific implementation. For example, technical features the same as or similar to the foregoing embodiments will not be repeated here.

As shown in FIG. 7, the method according to this embodiment may specifically include:

- S410: acquiring an effect action object to be added in response to an object addition trigger operation, and displaying an object subgraph corresponding to the effect action object in a visual edition region of an effect edition interface.
- S420: displaying a logic subgraph corresponding to an effect action logic to be added in the visual edition region in response to a logic addition trigger operation for the effect action object, and establishing a connection relationship between the object subgraph and a logic subgraph to obtain an effect logic diagram corresponding to the effect action object; for example, the logic subgraph includes at least one logic node, at least one logic node includes at least one level of node subgraph; at least one subgraph key parameter of the node subgraph included in the logic node is displayed in the logic node, and the subgraph key parameter includes a configurable parameter.

In this embodiment, the subgraph key parameters may be understood as a key parameter used for configuring the node subgraph. The subgraph key parameters may include a configurable parameter, or may also include a non-configurable parameter. For example, the configurable parameter may be understood as a parameter that may have a parameter value updated based on a user trigger operation; the non-configurable parameter may be understood as a parameter that cannot have a parameter value updated based on a user trigger operation. The parameter displayed in the logic node may be a subgraph key parameter of the node subgraph corresponding to the logic node; in other words, the parameter displayed in the logic node may be a subgraph key parameter used for configuring a next level of node subgraph. It should be noted that when at least one subgraph key parameter of the node subgraph included in the logic node is displayed in the logic node, a node key parameter corresponding to the logic node may also be displayed in the logic node, which will not be specifically limited in the embodiments of the present disclosure.

It should be noted that subgraph key parameters displayed in the logic node may only be displayed in the visual edition region, that is, the displayed subgraph key parameters are all non-configurable parameters, so that the user to clearly and intuitively understand the respective subgraph key parameters required for configuring the node subgraph; or, the subgraph key parameters displayed in the logic node may include a configurable parameter, so that the user may customize a parameter attribute value of the configurable parameter based on a parameter configuration operation. Further, the parameter attribute value of the configurable parameter displayed in the logic node may be updated based on a parameter configuration operation inputted by the user. Since the subgraph key parameter displayed in the logic node corresponds to the node subgraph of the logic node, the parameter attribute value of the configurable parameter corresponding to the node subgraph may also be updated while updating the parameter attribute value of the configurable parameter displayed in the logic node.

S430: updating the parameter attribute value of the configurable parameter displayed in the logic node and the parameter attribute value of the configurable parameter in the node subgraph, in response to a parameter configuration trigger operation for at least one configurable parameter of the node subgraph included in the logic node, when at least one subgraph key parameter of the node subgraph included in the logic node is displayed in the logic node.

In this embodiment, when at least one subgraph key parameter of the node subgraph included in the logic node is displayed in the logic node, and when the subgraph key parameter includes a configurable parameter, the user may configure the displayed configurable parameter based on a trigger operation, so as to update the parameter attribute value of the displayed configurable parameter.

In the related technologies, when at least one subgraph key parameter of the node subgraph included in the logic node is displayed in the logic node, after inputting the parameter configuration trigger operation for the displayed logic node, a parameter configuration box corresponding to the logic node will pop up in a display interface; the user may perform parameter configuration on the node subgraph included in the logic node in the parameter configuration box, and further update the parameter attribute value of the subgraph key parameter displayed in the logic node when a configuration completion trigger operation is detected. This may lead to a more complex parameter configuration process and reduce parameter configuration efficiency. During the parameter configuration process, there are more interaction operations between the user and the logic node, which affects the user's effect edition experience. Based on the technical solution provided by the embodiment of the present disclosure, when at least one subgraph key parameter of the node subgraph included in the logic node is displayed in the logic node, the user may directly input a parameter configuration operation for the configurable parameter displayed in the logic node, that is, directly configure the corresponding parameter attribute value in the configurable parameter edit item displayed in the logic node, update the parameter attribute value of the configurable parameter displayed in the logic node after configuration completion is detected; and at a same time, may also update the parameter attribute of the configurable parameter in the node subgraph of the logic node, so as to achieve an effect of configuring the parameter attribute value of the configurable parameter without entering the parameter configuration page, which improves convenience of the parameter configuration process, while also improves parameter configuration efficiency and enhances the user's effect edition experience.

In practical applications, the parameter configuration trigger operation for at least one configurable parameter of the node subgraph included in the logic node may be any operation acting on the configurable parameter. Optionally, the click operation for a configurable parameter may be a single-click operation or a multi-click operation (e.g., a double-click operation, etc.). In a specific implementation, the configurable parameter is updated to an editable state in response to the click operation for the configurable parameter; thereafter, the parameter attribute value of the configurable parameter is configured based on an input device; when it is detected that a duration of no operation on the interface reaches a preset duration, or when a trigger operation for any position on the effect edition interface is detected, it may be determined that the parameter configuration process of the configurable parameter is completed;

further, the parameter attribute value of the configurable parameter displayed in the logic node may be updated based on the configured parameter attribute value; and meanwhile, the parameter attribute value of the configurable parameter in the node subgraph of the logic node is updated.

Figure 8:
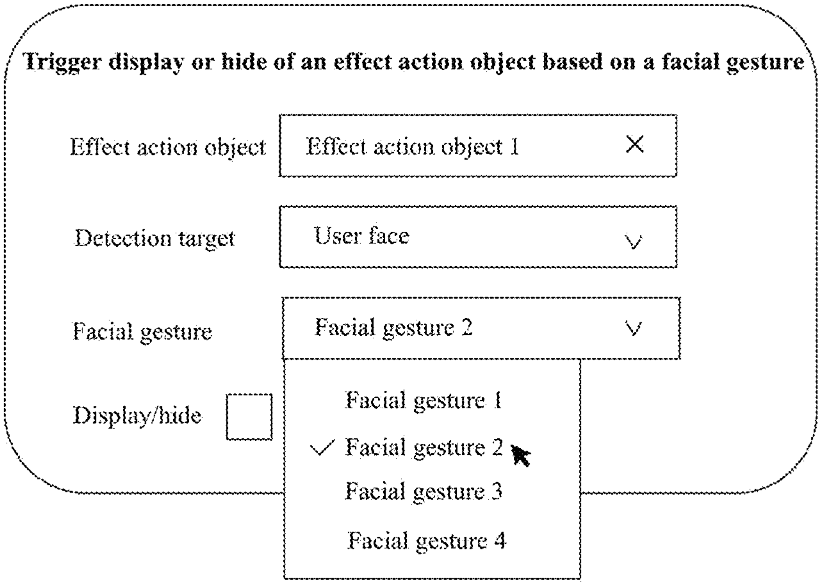
FIG. 8 is a schematic diagram of a logic subgraph provided by an embodiment of the present disclosure.

Exemplarily, as shown in FIG. 8, which is a schematic diagram of a logic node in an effect action logic; an effect action mode corresponding to the logic node or the child node may be "triggering display or hide of an effect action object based on a facial gesture".

The logic node may include an identifier of the logic node, an effect action object corresponding to the logic node and three configurable parameters, namely, a detection target parameter, a facial gesture parameter, and a display state parameter. For example, the effect action object corresponding to the logic node is just the effect action object corresponding to the effect action logic, which is a non-configurable parameter. The detection target parameter may be used for determining a target object in the image to be processed, for example, the user face. The facial gesture parameter may be used for selecting a facial trigger action of the target object. In practical applications, when a mouse cursor (an arrow in the diagram) inputs a trigger operation for the edit item of the facial gesture parameter, a plurality of preset facial trigger actions may be displayed, for example, facial gesture 1, facial gesture 2, facial gesture 3, and facial gesture 4, etc. Further, when a trigger operation by the mouse cursor for facial gesture 2 is detected, the facial gesture parameter of effect action logic I may be set to facial gesture 2. The display state parameter may be used for determining whether to display or hide the effect action object when it is detected that the target object of the image to be processed makes a facial trigger action, for example, when it is detected that the user face in the image to be processed makes facial gesture 2, the effect action object is displayed or hid.

It should be noted that the update process of the parameter attribute value of the configurable parameter displayed in the logic node is perceptible to the user, that is, the update process of the parameter attribute value of the configurable parameter may be directly exhibited based on the logic node displayed in the visual edition region; but the update process of the parameter attribute value of the configurable parameter in the node subgraph is imperceptible to the user, in other words, the update process of the parameter attribute value of the configurable parameter in the node subgraph cannot be directly exhibited based on the logic node displayed in the visual edition region; when the user wants to view the update state of the parameter attribute value of the configurable parameter in the node subgraph, the user may input a node view operation for the updated logic node; the node subgraph corresponding to the logic node is displayed in response to the node view operation, and the parameter attribute value of the updated configurable parameter may be displayed in the node subgraph.

S440: displaying the effect action object with the effect outcome corresponding to the effect logic diagram, in response to the effect display trigger operation.

The technical solution of the embodiment of the present disclosure involves: acquiring the effect action object to be added in response to the object addition trigger operation, and displaying the object subgraph corresponding to the effect action object in the visual edition region of the effect edition interface; then, displaying the logic subgraph corresponding to the effect action logic to be added in the visual edition region in response to the logic addition trigger operation for the effect action object, and establishing the connection relationship between the object subgraph and the logic subgraph to obtain the effect logic diagram corresponding to the effect action object; for example, the logic subgraph includes at least one logic node, at least one logic node includes at least one level of node subgraph; at least one subgraph key parameter of the node subgraph included in the logic node is displayed in the logic node, and the subgraph key parameter includes a configurable parameter; thereafter, updating the parameter attribute value of the configurable parameter displayed in the logic node and the parameter attribute value of the configurable parameter in the node subgraph, in response to the parameter configuration trigger operation for at least one configurable parameter of the node subgraph included in the logic node, when at least one subgraph key parameter of the node subgraph included in the logic node is displayed in the logic node; and finally, displaying the effect action object with the effect outcome corresponding to the effect logic diagram, in response to the effect display trigger operation; which achieves an effect of custom parameter configuration for the configurable parameter displayed in the logic node, enhances personalized adaptability between the effect action logic edited by the user and the user, enhances intelligence and diversity of the effect action logic edition functions, and improves use experience of the user.

Figure 9:
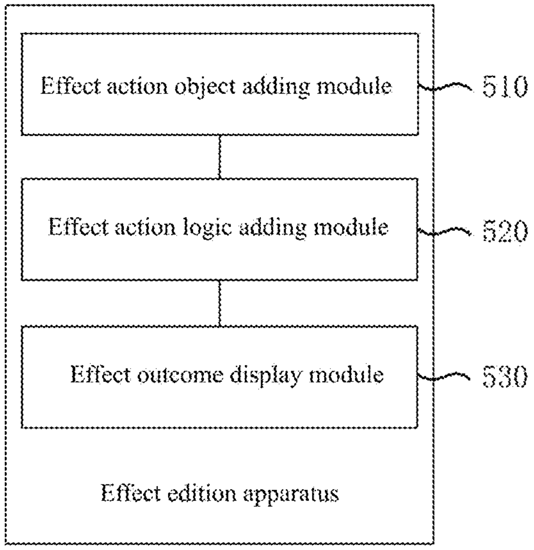
FIG. 9 is a structural schematic diagram of an effect edition apparatus provided by an embodiment of the present disclosure.

FIG. 9 is a structural schematic diagram of an effect edition apparatus provided by an embodiment of the present disclosure; and as shown in FIG. 9, the apparatus includes an effect action object adding module 510, an effect action logic adding module 520, and an effect outcome display module 530.

For example, the effect action object adding module 510 is configured to acquire an effect action object to be added in response to an object addition trigger operation, and display an object subgraph corresponding to the effect action object in a visual edition region of an effect edition interface; the effect action logic adding module 520 is configured to display a logic subgraph corresponding to the effect action logic to be added in the visual edition region in response to a logic addition trigger operation for the effect action object, and establish a connection relationship between the object subgraph and the logic subgraph to obtain an effect logic diagram corresponding to the effect action object; and the effect outcome display module 530 is configured to display the effect action object with the effect outcome corresponding to the effect logic diagram in response to an effect display trigger operation.

On the basis of the above-described respective technical solutions, the effect action logic adding module 520 includes: an effect action logic display unit and a logic subgraph display unit. For example, the effect action logic display unit is configured to display at least one candidate effect action logic corresponding to the effect action object, in response to a logic display trigger operation; and the logic subgraph display unit is configured to display the logic subgraph corresponding to the selected effect action logic in the visual edition region in response to a logic selection trigger operation for the candidate effect action logic.

On the basis of the above-described respective technical solutions, the effect action logic display unit is specifically configured to: determine at least one candidate effect action logic corresponding to the effect action object, based on an object type corresponding to the effect action object, and display the candidate effect action logic.

On the basis of the above-described respective technical solutions, the logic subgraph includes at least one logic node; at least one logic node includes at least one level of node subgraph; and the node subgraph includes a plurality of child nodes.

On the basis of the above-described respective technical solutions, the apparatus further includes: a node subgraph display module. For example, the node subgraph display module is configured to display the node subgraph corresponding to the logic node, in response to a node view trigger operation for the logic node in the logic subgraph, after displaying the logic subgraph corresponding to the effect action logic in the visual edition region.

On the basis of the above-described respective technical solutions, the apparatus further includes: a trigger operation responding module. For example, the trigger operation responding module is configured to update the node subgraph based on a node edition trigger operation, in response to the node edition trigger operation for the child node in the node subgraph, after the displaying the node subgraph corresponding to the logic node, for example, the node edition trigger operation includes at least one of a node addition trigger operation, a node modification trigger operation, and a node deletion trigger operation.

On the basis of the above-described respective technical solutions, at least one subgraph key parameter of the node subgraph included in the logic node is displayed in the logic node.

On the basis of the above-described respective technical solutions, the subgraph key parameter may include a configurable parameter. Further, the apparatus further includes: an attribute value update module. For example, the attribute value update module is configured to update a parameter attribute value of the configurable parameter displayed in the logic node and a parameter attribute value of the configurable parameter in the node subgraph, in response to a parameter configuration trigger operation for at least one configurable parameter of the node subgraph included in the logic node, after at least one subgraph key parameter of the node subgraph included in the logic node is displayed in the logic node.

On the basis of the above-described respective technical solutions, the effect outcome display module 530 is specifically configured to: generate an effect execution script corresponding to the effect action object based on the effect logic diagram, execute the effect execution script to obtain an effect outcome, and display the effect action object with the effect outcome.

The technical solution of the embodiment of the present disclosure involves: acquiring the effect action object to be added in response to the object addition trigger operation, and displaying the object subgraph corresponding to the effect action object in the visual edition region of the effect edition interface, which may accurately capture editing intention the user for the effect action object; displaying the object subgraph of the effect action object, and adding the visual edition region in the effect edition interface to visualize the effect edition process; further, displaying the logic subgraph corresponding to the effect action logic to be added in the visual edition region, in response to the logic addition trigger operation for the effect action object, and establishing the connection relationship between the object subgraph and the logic subgraph to obtain an effect logic diagram corresponding to the effect action object, which enhances correlation between the effect action object and the effect action logic; obtaining the effect logic diagram based on subgraph connection, which simplifies the effect edition operation process; and finally, displaying the effect action object with the effect outcome corresponding to the effect logic diagram in response to the effect display trigger operation, thereby solving the technical problem in the related technologies that effect edition is time-consuming and laborious due to excessively high professional requirements, and implementing visual presentation of the edition process of the effect outcome of the effect action object, which may be implemented through simple interactive operations, with wider applicability and improved effect edition experience.

The effect edition apparatus provided by the embodiment of the present disclosure may execute the effect edition method provided by any embodiment of the present disclosure, and has corresponding functional modules and advantageous effects for executing the method.

It is worth noting that the respective units and modules included in the above-described apparatus are only divided according to functional logic, but are not limited to the above-described division, as long as the corresponding functions may be implemented; in addition, specific names of the respective functional units are only intended to facilitate distinguishing them from each other, and are not used to limit the scope of protection of the embodiments of the present disclosure.

Figure 10:
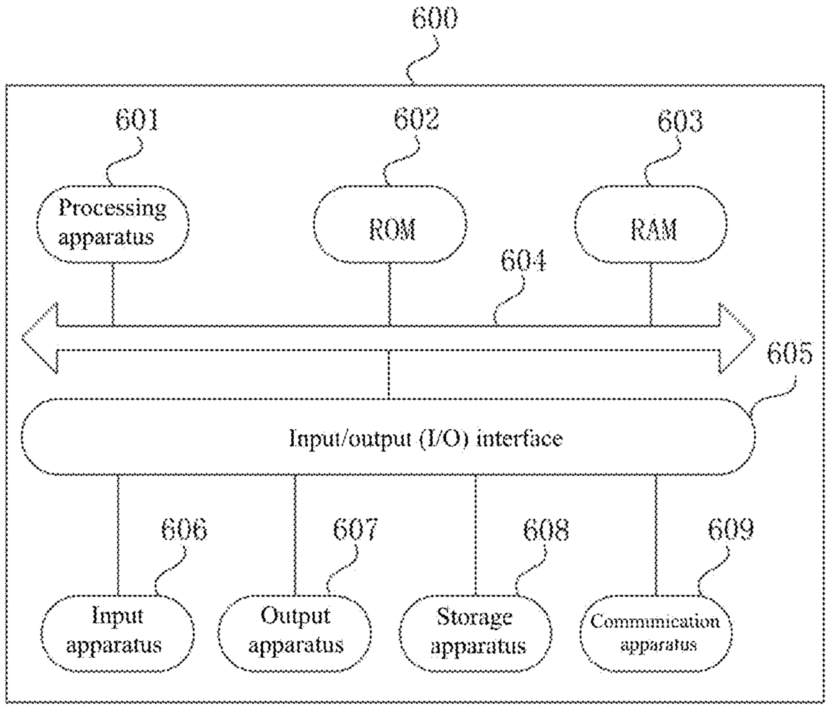
FIG. 10 is a structural schematic diagram of an electronic device provided by an embodiment of the present disclosure.

FIG. 10 is a structural schematic diagram of an electronic device provided by an embodiment of the present disclosure. FIG. 10 is specifically referred below, and it shows the structure schematic diagram suitable for achieving the electronic device 600 (For example, a terminal device or a server in FIG. 10) in the embodiment of the present disclosure. The electronic device 600 in the embodiment of the present disclosure may include but not be limited to a mobile terminal such as a mobile phone, a notebook computer, a digital broadcasting receiver, a personal digital assistant (PDA), a PAD (tablet computer), a portable multimedia player (PMP), a vehicle terminal (such as a vehicle navigation terminal), and a fixed terminal such as a digital television (TV) and a desktop computer. The electronic device shown in FIG. 10 is only an example and should not impose any limitations on the functions and use scopes of the embodiments of the present disclosure.

As shown in FIG. 10, the electronic device 600 may include a processing apparatus (such as a central processing unit, and a graphics processor) 601, it may execute various appropriate actions and processes according to a program stored in a read-only memory (ROM) 602 or a program loaded from a storage apparatus 608 to a random access memory (RAM) 603. In RAM 603, various programs and data required for operations of the electronic device 600 are also stored. The processing apparatus 601, ROM 602, and RAM 603 are connected to each other by a bus 604. An input/output (I/O) interface 605 is also connected to the bus 604.

Typically, the following apparatuses may be connected to the I/O interface 605: an input apparatus 606 such as a touch screen, a touchpad, a keyboard, a mouse, a camera, a microphone, an accelerometer, and a gyroscope; an output apparatus 607 such as a liquid crystal display (LCD), a loudspeaker, and a vibrator; a storage apparatus 608 such as a magnetic tape, and a hard disk drive; and a communication apparatus 609. The communication apparatus 609 may allow the electronic device 600 to wireless-communicate or wire-communicate with other devices so as to exchange data. Although FIG. 6 shows the electronic device 600 with various apparatuses, it should be understood that it is not required to implement or possess all the apparatuses shown. Alternatively, it may implement or possess the more or less apparatuses.

Specifically, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 609, or installed from the storage apparatus 608, or installed from ROM 602. When the computer program is executed by the processing apparatus 601, the above functions defined in the embodiments of the present disclosure are executed.

Names of messages or information interacted between a plurality of apparatuses according to the implementations of the present disclosure are only used for illustrative purposes, and are not used to limit the scope of these messages or information.

The electronic device provided by the embodiment of the present disclosure and the effect edition method provided by the above-described embodiments belong to a same inventive concept. The above-described embodiments may be referred to for technical details not described in detail in this embodiment; and this embodiment has the same advantageous effects as the above-described embodiments.

An embodiment of the present disclosure provides a computer storage medium, having a computer program stored thereon, for example, the program, when executed by a processor, implements the effect edition method provided by the above-described embodiments.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The above-described computer readable medium may be included in the above-described electronic device; or may also exist alone without being assembled into the electronic device.

The above-described computer readable medium carries one or more programs; and the above-described one or more programs, when executed by the electronic device, cause the electronic device to execute steps of:

Acquiring an effect action object to be added in response to an object addition trigger operation, and displaying an object subgraph corresponding to the effect action object in a visual edition region of an effect edition interface;

Displaying a logic subgraph corresponding to an effect action logic to be added in the visual edition region in response to a logic addition trigger operation for the effect action object, and establishing a connection relationship between the object subgraph and the logic subgraph to obtain an effect logic diagram corresponding to the effect action object; and Displaying the effect action object with the effect outcome corresponding to the effect logic diagram in response to an effect display trigger operation.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, Example 1 provides an effect edition method, including:

Acquiring an effect action object to be added in response to an object addition trigger operation, and displaying an object subgraph corresponding to the effect action object in a visual edition region of an effect edition interface;

Displaying a logic subgraph corresponding to an effect action logic to be added in the visual edition region in response to a logic addition trigger operation for the effect action object, and establishing a connection relationship between the object subgraph and the logic subgraph to obtain an effect logic diagram corresponding to the effect action object; and Displaying the effect action object with the effect outcome corresponding to the effect logic diagram in response to an effect display trigger operation.

According to one or more embodiments of the present disclosure, Example 2 provides the method of Example 1, further including:

Optionally, the displaying a logic subgraph corresponding to an effect action logic to be added in the visual edition region in response to a logic addition trigger operation for the effect action object, includes: displaying at least one candidate effect action logic corresponding to the effect action object, in response to a logic display trigger operation for the effect action object; and Displaying the logic subgraph corresponding to the selected effect action logic in the visual edition region in response to a logic selection trigger operation for the candidate effect action logic.

According to one or more embodiments of the present disclosure, Example 3 provides the method of Example 2, further including:

Optionally, the displaying at least one candidate effect action logic corresponding to the effect action object, includes: determining at least one candidate effect action logic corresponding to the effect action object, based on an object type corresponding to the effect action object, and displaying the candidate effect action logic.

According to one or more embodiments of the present disclosure, Example 4 provides the method of Example 1, further including:

Optionally, the logic subgraph includes at least one logic node; at least one logic node includes at least one level of node subgraph; and the node subgraph includes a plurality of child nodes.

According to one or more embodiments of the present disclosure, Example 5 provides the method of Example 4, further including:

Optionally, after the displaying the logic subgraph corresponding to the selected effect action logic in the visual edition region, the method further includes: displaying the node subgraph corresponding to the logic node, in response to a node view trigger operation for the logic node in the logic subgraph.

According to one or more embodiments of the present disclosure, Example 6 provides the method of Example 5, further including:

Optionally, after the displaying the node subgraph corresponding to the logic node, the method further includes: updating the node subgraph based on a node edition trigger operation, in response to the node edition trigger operation for the child node in the node subgraph, for example, the node edition trigger operation includes at least one of a node addition trigger operation, a node modification trigger operation, and a node deletion trigger operation.

According to one or more embodiments of the present disclosure, Example 7 provides the method of Example 4, further including:

Optionally, at least one subgraph key parameter of the node subgraph included in the logic node is displayed in the logic node.

According to one or more embodiments of the present disclosure, Example 8 provides the method of Example 7, further including:

Optionally, the subgraph key parameter includes a configurable parameter; and after the displaying at least one subgraph key parameter of the node subgraph included in the logic node in the logic node, the method further includes: updating a parameter attribute value of the configurable parameter displayed in the logic node and a parameter attribute value of the configurable parameter in the node subgraph, in response to a parameter configuration trigger operation for at least one configurable parameter of the node subgraph included in the logic node.

According to one or more embodiments of the present disclosure, Example 9 provides the method of Example 1, further including:

Optionally, the displaying the effect action object with the effect outcome corresponding to the effect logic diagram, includes: generating an effect execution script corresponding to the effect action object based on the effect logic diagram, executing the effect execution script to obtain an effect outcome, and displaying the effect action object with the effect outcome.

According to one or more embodiments of the present disclosure, Example 10 provides an effect edition apparatus, including:

An effect action object adding module, configured to acquire an effect action object to be added in response to an object addition trigger operation, and display an object subgraph corresponding to the effect action object in a visual edition region of an effect edition interface;

An effect action logic adding module, configured to display a logic subgraph corresponding to the effect action logic to be added in the visual edition region in response to a logic addition trigger operation for the effect action object, and establish a connection relationship between the object subgraph and the logic subgraph to obtain an effect logic diagram corresponding to the effect action object; and An effect outcome display module, configured to display the effect action object with the effect outcome corresponding to the effect logic diagram in response to an effect display trigger operation.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. An effect edition method, comprising:

acquiring an effect action object to be added in response to an object addition trigger operation, and displaying an object subgraph corresponding to the effect action object in a visual edition region of an effect edition interface;

displaying a logic subgraph corresponding to an effect action logic to be added in the visual edition region in response to a logic addition trigger operation for the effect action object, and establishing a connection relationship between the object subgraph and the logic subgraph to obtain an effect logic diagram corresponding to the effect action object; and displaying the effect action object with an effect outcome corresponding to the effect logic diagram in response to an effect display trigger operation, wherein the logic subgraph comprises at least one logic node, the at least one logic node comprises at least one level of node subgraph, and the node subgraph comprises a plurality of child nodes.

2. The effect edition method according to claim 1, wherein, the displaying a logic subgraph corresponding to an effect action logic to be added in the visual edition region in response to a logic addition trigger operation for the effect action object, comprises:

displaying at least one candidate effect action logic corresponding to the effect action object, in response to a logic display trigger operation for the effect action object; and displaying the logic subgraph corresponding to the effect action logic, which is selected, in the visual edition region in response to a logic selection trigger operation for the candidate effect action logic.

3. The effect edition method according to claim 2, wherein, the displaying at least one candidate effect action logic corresponding to the effect action object, comprises:

determining at least one candidate effect action logic corresponding to the effect action object, based on an object type corresponding to the effect action object, and displaying the candidate effect action logic.

4. The effect edition method according to claim 1, wherein, after the displaying the logic subgraph corresponding to the selected effect action logic in the visual edition region, the method further comprises:

displaying a node subgraph corresponding to a logic node, in response to a node view trigger operation for the logic node in the logic subgraph.

5. The effect edition method according to claim 4, wherein, after the displaying the node subgraph corresponding to the logic node, the method further comprises:

updating the node subgraph based on a node edition trigger operation, in response to the node edition trigger operation for the child node in the node subgraph, wherein the node edition trigger operation comprising at least one of a node addition trigger operation, a node modification trigger operation, and a node deletion trigger operation.

6. The effect edition method according to claim 1, wherein, at least one subgraph key parameter of the node subgraph comprised in the logic node is displayed in the logic node.

7. The effect edition method according to claim 6, wherein, the subgraph key parameter comprises a configurable parameter; and after the displaying at least one subgraph key parameter of the node subgraph comprised in the logic node in the logic node, the method further comprises:

updating a parameter attribute value of the configurable parameter displayed in the logic node and a parameter attribute value of the configurable parameter in the node subgraph, in response to a parameter configuration trigger operation for at least one configurable parameter of the node subgraph comprised in the logic node.

8. The effect edition method according to claim 1, wherein, the displaying the effect action object with an effect outcome corresponding to the effect logic diagram, comprises:

generating an effect execution script corresponding to the effect action object based on the effect logic diagram, executing the effect execution script to obtain the effect outcome, and displaying the effect action object with the effect outcome.

9. An electronic device, comprising:

one or more processors;

a storage apparatus, configured to store one or more programs, wherein, the one or more programs, when executed by the one or more processors, cause the one or more processors to implement operations, the operations comprise:

acquiring an effect action object to be added in response to an object addition trigger operation, and displaying an object subgraph corresponding to the effect action object in a visual edition region of an effect edition interface;

displaying a logic subgraph corresponding to an effect action logic to be added in the visual edition region in response to a logic addition trigger operation for the effect action object, and establishing a connection relationship between the object subgraph and the logic subgraph to obtain an effect logic diagram corresponding to the effect action object; and displaying the effect action object with an effect outcome corresponding to the effect logic diagram in response to an effect display trigger operation, wherein the logic subgraph comprises at least one logic node, at least one logic node comprises at least one level of node subgraph, and the node subgraph comprises a plurality of child nodes.

10. The electronic device according to claim 9, wherein, the displaying a logic subgraph corresponding to an effect action logic to be added in the visual edition region in response to a logic addition trigger operation for the effect action object, comprises:

displaying at least one candidate effect action logic corresponding to the effect action object, in response to a logic display trigger operation for the effect action object; and displaying the logic subgraph corresponding to the effect action logic, which is selected, in the visual edition region in response to a logic selection trigger operation for the candidate effect action logic.

11. The electronic device according to claim 10, wherein, the displaying at least one candidate effect action logic corresponding to the effect action object, comprises:

determining at least one candidate effect action logic corresponding to the effect action object, based on an object type corresponding to the effect action object, and displaying the candidate effect action logic.

12. The electronic device according to claim 9, wherein, after the displaying the logic subgraph corresponding to the selected effect action logic in the visual edition region, the operations further comprise:

displaying a node subgraph corresponding to a logic node, in response to a node view trigger operation for the logic node in the logic subgraph.

13. The electronic device according to claim 12, wherein, after the displaying the node subgraph corresponding to the logic node, the operations further comprise:

updating the node subgraph based on a node edition trigger operation, in response to the node edition trigger operation for the child node in the node subgraph, wherein the node edition trigger operation comprising at least one of a node addition trigger operation, a node modification trigger operation, and a node deletion trigger operation.

14. The electronic device according to claim 9, wherein, at least one subgraph key parameter of the node subgraph comprised in the logic node is displayed in the logic node.

15. The electronic device according to claim 14, wherein, the subgraph key parameter comprises a configurable parameter; and after the displaying at least one subgraph key parameter of the node subgraph comprised in the logic node in the logic node, the operations further comprise:

updating a parameter attribute value of the configurable parameter displayed in the logic node and a parameter attribute value of the configurable parameter in the node subgraph, in response to a parameter configuration trigger operation for at least one configurable parameter of the node subgraph comprised in the logic node.

16. The electronic device according to claim 9, wherein, the displaying the effect action object with an effect outcome corresponding to the effect logic diagram, comprises:

generating an effect execution script corresponding to the effect action object based on the effect logic diagram, executing the effect execution script to obtain the effect outcome, and displaying the effect action object with the effect outcome.

17. A non-transitory storage medium, comprising computer executable instructions, wherein, the computer executable instructions, when executed by a computer processor, are configured to execute operations, the operations comprise:

acquiring an effect action object to be added in response to an object addition trigger operation, and displaying an object subgraph corresponding to the effect action object in a visual edition region of an effect edition interface;

displaying a logic subgraph corresponding to an effect action logic to be added in the visual edition region in response to a logic addition trigger operation for the effect action object, and establishing a connection relationship between the object subgraph and the logic subgraph to obtain an effect logic diagram corresponding to the effect action object; and displaying the effect action object with an effect outcome corresponding to the effect logic diagram in response to an effect display trigger operation, wherein the logic subgraph comprises at least one logic node, at least one logic node comprises at least one level of node subgraph, and the node subgraph comprises a plurality of child nodes.

18. The non-transitory storage medium according to claim 17, wherein, the displaying a logic subgraph corresponding to an effect action logic to be added in the visual edition region in response to a logic addition trigger operation for the effect action object, comprises:

displaying at least one candidate effect action logic corresponding to the effect action object, in response to a logic display trigger operation for the effect action object; and displaying the logic subgraph corresponding to the effect action logic, which is selected, in the visual edition region in response to a logic selection trigger operation for the candidate effect action logic.

19. The non-transitory storage medium according to claim 17, wherein after the displaying the logic subgraph corresponding to the selected effect action logic in the visual edition region, the operations further comprise:

displaying a node subgraph corresponding to a logic node, in response to a node view trigger operation for the logic node in the logic subgraph.

20. The non-transitory storage medium according to claim 17, wherein the displaying the effect action object with an effect outcome corresponding to the effect logic diagram comprises:

generating an effect execution script corresponding to the effect action object based on the effect logic diagram, executing the effect execution script to obtain the effect outcome, and displaying the effect action object with the effect outcome.

* * * * *